(12) United States Patent
Deole et al.

(10) Patent No.: US 12,170,095 B2
(45) Date of Patent: *Dec. 17, 2024

(54) OPTIMIZING INTERACTION RESULTS USING AI-GUIDED MANIPULATED VIDEO

(71) Applicant: Avaya Management L.P., Durham, NC (US)

(72) Inventors: Pushkar Yashavant Deole, Pune (IN); Sandesh Chopdekar, Pune (IN)

(73) Assignee: Avaya Management L.P., Durham, NC (US)

( * ) Notice: Subject to any disclaimer, the term of this patent is extended or adjusted under 35 U.S.C. 154(b) by 530 days.

This patent is subject to a terminal disclaimer.

(21) Appl. No.: 17/468,303

(22) Filed: Sep. 7, 2021

(65) Prior Publication Data

US 2021/0407527 A1    Dec. 30, 2021

Related U.S. Application Data

(63) Continuation-in-part of application No. 16/535,169, filed on Aug. 8, 2019, now Pat. No. 11,182,595.

(51) Int. Cl.
*G06K 9/00* (2022.01)
*G10L 15/18* (2013.01)
(Continued)

(52) U.S. Cl.
CPC ........ *G10L 21/013* (2013.01); *G10L 15/1815* (2013.01); *G10L 15/22* (2013.01); *G10L 2021/0135* (2013.01)

(58) Field of Classification Search
CPC .......... G06K 9/00315; G06K 9/00248; G06K 9/00281; G06T 19/00
See application file for complete search history.

(56) References Cited

U.S. PATENT DOCUMENTS 8,634,543 B2  1/2014 Flockhart et al.
8,964,958 B2  2/2015 Steiner
(Continued)

FOREIGN PATENT DOCUMENTS

CN  109934767  6/2019
JP  2005-151231  6/2005
(Continued)

OTHER PUBLICATIONS

Official Action with English Translation for China Patent Application No. 202010788167.4, dated Dec. 9, 2023 14 pages.
(Continued)

*Primary Examiner* — Fayyaz Alam
(74) *Attorney, Agent, or Firm* — Sheridan Ross P.C.

(57) ABSTRACT

Real-time modification of audio of humans allows for the audio to be modified so that an expression of a subject human may be changed. Customer service agents may have more successful interactions with customers if they provide vocalization attribute in their speech that are appropriate, such as to provide a particular emotional state. By determining an appropriate vocalization attribute, and any deviation from a customer service agent's current vocalization attribute, a modification to the audio of the customer service agent's speech may be determined and applied. As a result, agents may not have a vocalization attribute that is best suited to successfully resolve a purpose of the interaction, altered to have the customer be presented with the customer service agent's speech having the best-suited vocalization attribute.

20 Claims, 10 Drawing Sheets

(51) Int. Cl.
*G10L 15/22* (2006.01)
*G10L 21/013* (2013.01)

(56) References Cited

U.S. PATENT DOCUMENTS

| | | | | |
|---|---|---|---|---|
| 9,104,908 | B1* | 8/2015 | Rogers | G06V 40/176 |
| 10,021,276 | B1 | 7/2018 | Chang | |
| 10,354,256 | B1 | 7/2019 | McInerny | |
| 11,182,595 | B2 | 11/2021 | Matula et al. | |
| 2004/0215451 | A1* | 10/2004 | Macleod | G10L 13/00 |
| | | | | 704/E21.001 |
| 2004/0263510 | A1* | 12/2004 | Marschner | G06T 13/40 |
| | | | | 345/419 |
| 2007/0115350 | A1* | 5/2007 | Currivan | H04N 7/147 |
| | | | | 348/14.08 |
| 2008/0068397 | A1 | 3/2008 | Carey et al. | |
| 2010/0235218 | A1 | 9/2010 | Erhart et al. | |
| 2011/0125793 | A1 | 5/2011 | Erhart et al. | |
| 2011/0125826 | A1 | 5/2011 | Erhart et al. | |
| 2012/0058747 | A1* | 3/2012 | Yiannios | H04M 1/72427 |
| | | | | 704/E11.001 |
| 2013/0272565 | A1 | 10/2013 | Fagundes et al. | |
| 2014/0376785 | A1 | 12/2014 | Bathiche et al. | |
| 2016/0148043 | A1* | 5/2016 | Bathiche | H04N 7/147 |
| | | | | 382/118 |
| 2017/0206095 | A1 | 7/2017 | Gibbs et al. | |
| 2018/0270356 | A1* | 9/2018 | Dumaine | G06F 18/24 |
| 2019/0027158 | A1* | 1/2019 | Togawa | G10L 25/51 |
| 2019/0172243 | A1 | 6/2019 | Mishra et al. | |
| 2019/0289258 | A1* | 9/2019 | Peterson | G06V 10/82 |
| 2019/0378532 | A1* | 12/2019 | Aucouturier | G10L 21/003 |
| 2020/0380950 | A1* | 12/2020 | Truong | G10L 13/0335 |
| 2021/0012097 | A1* | 1/2021 | Velthuis | G06V 40/172 |

FOREIGN PATENT DOCUMENTS

| | | | |
|---|---|---|---|
| JP | 2005151231 A * | 6/2005 | |
| JP | 2019-086858 | 6/2019 | |
| JP | 2021-107873 | 7/2021 | |
| WO | WO 2015/101523 | 7/2015 | |
| WO | WO 2017/210633 | 12/2017 | |
| WO | WO 2020/171868 | 8/2020 | |

OTHER PUBLICATIONS

Notice of Allowance with Machine Translation for China Patent Application No. 202010788167.4, dated Feb. 6, 2024 3 pages.

"Create AI Voices that sound real," Resemble.AI, 2021, 10 pages [retrieved online from: resemble.ai].

HAO "AI voice actors sound more human than ever—and they're ready to hire," MIT Technology Review, Jul. 9, 2021, 11 pages [retrieved online from: www.technologyreview.com/2021/07/09/1028140/ai-voice-actors-sound-human/].

Nakano et al. "Vocal Manipulation Based on Pitch Transcription and Its Application to Interactive Entertainment for Karaoke," International Workshop on Haptic and Audio Interaction Design (HAID 2011), 2011, Lecture Notes in Computer Science, vol. 6851, pp. 52-60 (Abstract Only) [https://link.springer.com/chapter/10.1007/978-3-642-22950-3_6].

Otsuka et al. "Voice quality manipulation for humanoid robots consistent with their head movements," 2009 9th IEEE-RAS international Conference on Humanoid Robots, Dec. 2009, pp. 405-410 (Abstract Only) [retrieved online from: ieeexplore.ieee.org/document/5379569].

Vincent "Artificial intelligence is going to make it easier than ever to fake images and video," The Verge, Dec. 20, 2016, 7 pages [retrieved online from: www.theverge.com/2016/12/20/14022958/ai-image-manipulation-creation-fakes-audio-video].

Extended Search Report for European Patent Application No. 20189794.9, dated Jan. 12, 2021 14 pages.

Official Action for U.S. Appl. No. 16/535,169, dated Mar. 24, 2021 19 pages.

Notice of Allowance for U.S. Appl. No. 16/535,169, dated Jul. 13, 2021 8 pages.

Official Action with English Translation for China Patent Application No. 202010788167.4, dated Jul. 29, 2023 20 pages.

Extended Search Report for European Patent Application No. 22193496.1, dated Feb. 1, 2023 10 pages.

Official Action for European Patent Application No. 20189794.9, dated Feb. 29, 2024 11 pages.

* cited by examiner

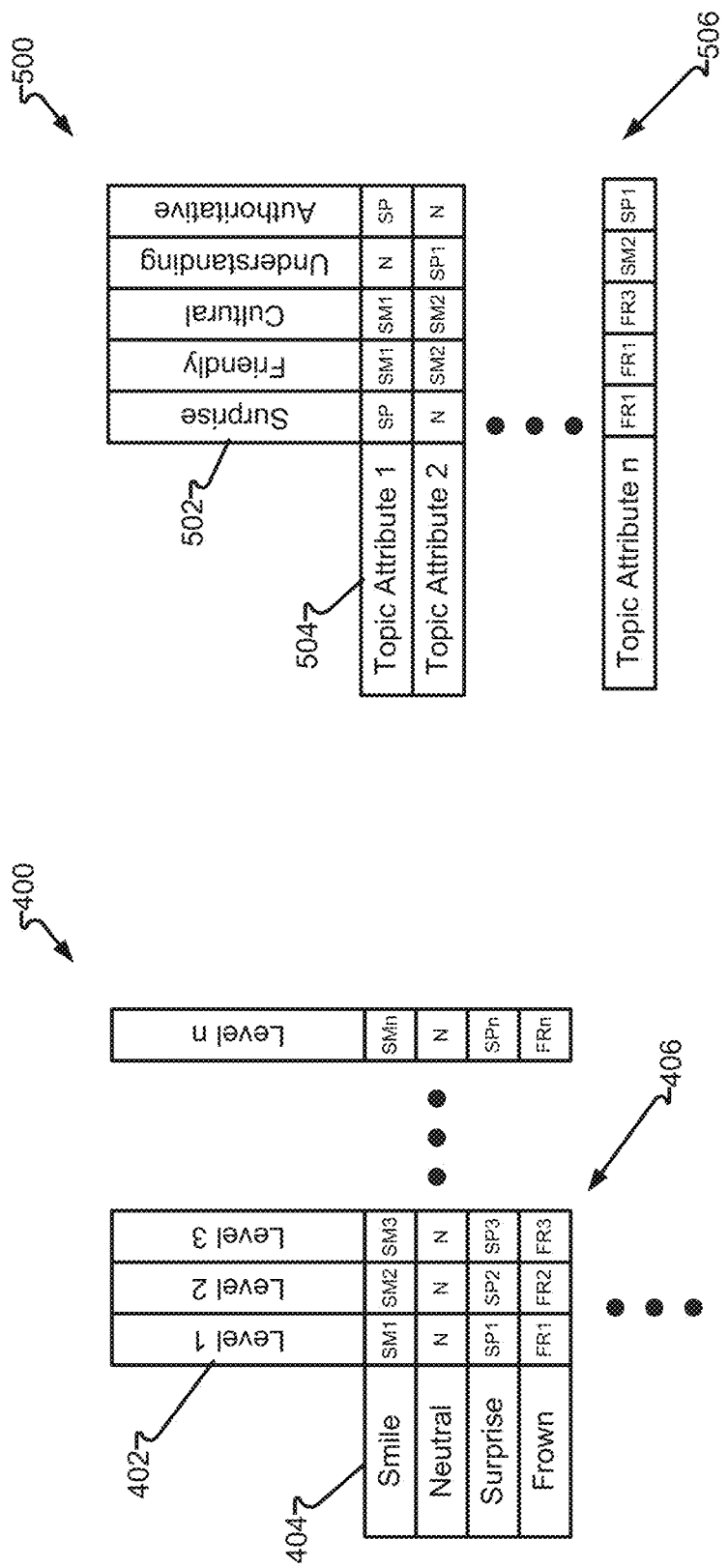

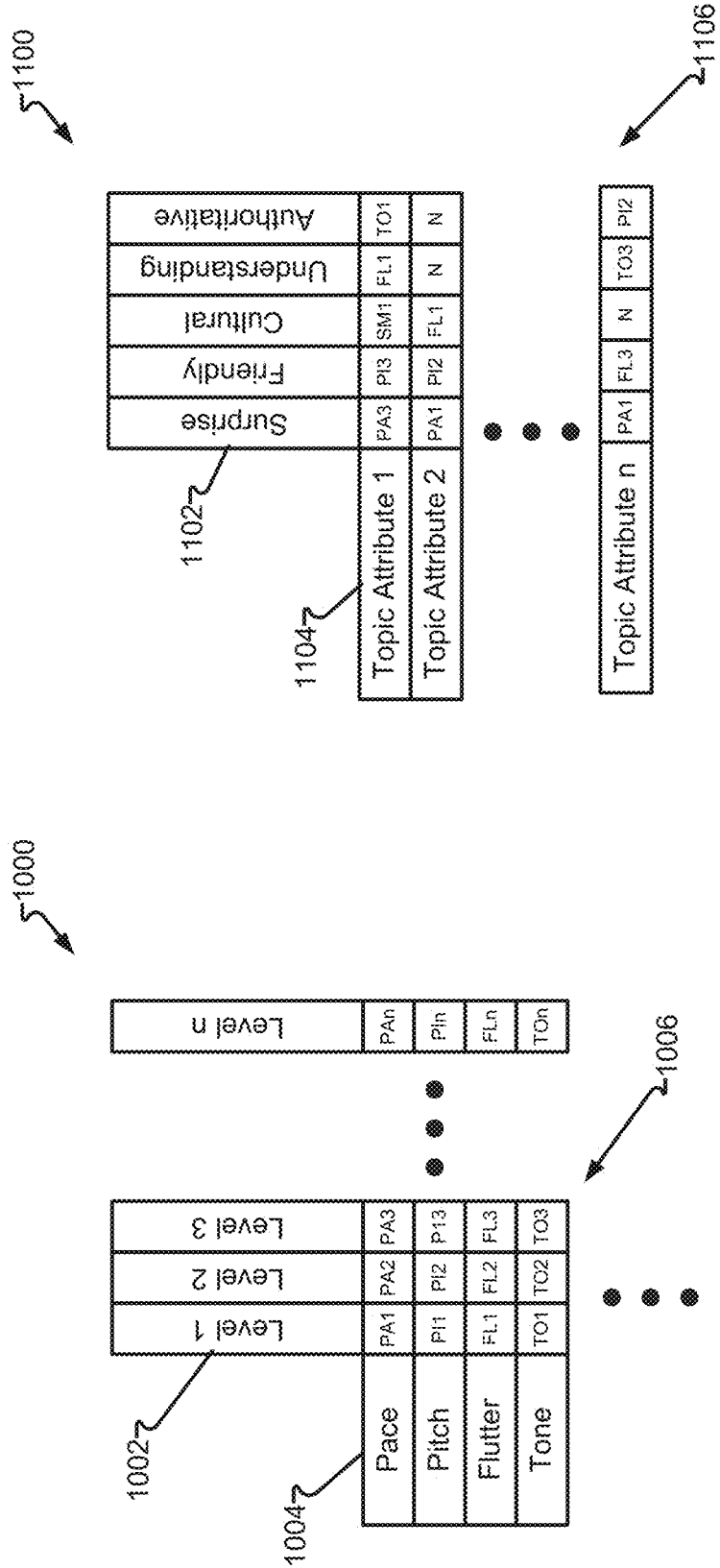

OPTIMIZING INTERACTION RESULTS USING AI-GUIDED MANIPULATED VIDEO

PRIORITY CLAIM

The present application is a continuation-in-part of, and claims the benefit of, U.S. patent application Ser. No. 16/535,169, entitled, "Optimizing Interaction Results Using AI-Guided Manipulated Video," filed on Aug. 8, 2019, and is incorporated herein by reference.

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for video image processing and particularly to altering an expression of a human in a video image.

BACKGROUND

Video images of customer service agents provide the ability for the customer to see the agent and may facilitate better interactions therebetween to address a particular issue. It is known that a person's demeanor including facial expressions can affect the outcome of an interaction, either positively or negatively. Currently, agents are coached and trained to provide the appropriate facial expressions to drive the best possible outcome of an interaction—whether they know what to do or not, and whether they are in a good mood or not. Training, coaching prior to calls, and "in-call" real-time hints/coaching may help, but they still rely on the agent's ability to translate such instructions into proper facial expressions. While it may be possible to utilize an avatar, which may be programmed to provide the exact facial expression desired, avatars do not convey the personal aspects of a real person. When a customer interacts with an avatar of an agent, the interaction may fail to provide the desired benefits of a customer seeing the agent.

Customer service is one of the important aspects that defines a business's success. For many businesses, the outcome of a customer service interaction depends significantly on the agent who is engaged in that interaction with the customer. It is known that a person's demeanor, especially during vocal interaction, including different voice attributes can affect the outcome of interactions, positively or negatively.

This becomes particularly important during voice-only calls. However, even when a communication comprises audio and video, the right vocal attributes of the agent are important means for conveying the emotions or sentiment properly. Some studies have indicated that speech may have a stronger impact than visual cues (e.g., facial expressions) on detecting the emotion of another party. When a participant in a communication has visual and auditory content with attributes that do not have the same emotional content, such a communication may be perceived negatively, such as being contrived or insincere.

SUMMARY

In many contact centers, agents are relied-upon to "do the right thing" in terms of using the right facial expressions and/or vocal attributes to drive the best possible outcome of an interaction with a customer--whether they consciously know what to do or not and without regard to their own current emotional state. Coaching prior to calls and in-call real time hints/coaching can help, but to deliver the proper emotional content still depends on the agent's ability to deliver a communication with the proper vocal attributes appropriate for the particular communication currently at hand.

In one embodiment, artificial intelligence provides altered audio, such as audio deepfake, voice cloning etc.), to the voice attributes of agent. An agent is monitored in real time to see if modification is suitable for the situation and, if so, the appropriate sentiment or emotion is applied to the call when there is a mismatch between a determined desired sentiment or emotional audio content and the currently observed sentiment or emotional audio content. If a mismatch is present, then systems and methods are provided to alter the audio so the audio, as delivered into the communication channel, comprises the sentiment or emotion that is determined to be appropriate for the communication but absent from the unaltered speech of the agent.

In another embodiment, real-time processing of audio allows audio to be modified (e.g., auditory deepfake, alter tone, pacing, accent, inflection, lilt, etc.) into different voice attributes so as to have speech attributes, such as those conveying emotion or sentiment, that are determined to be more suitable for a given communication content or customer.

In another embodiment, an AI, such as a trained neural network, takes the language content (e.g., words, phrases, utterances) of an agent's speech and modifies the audio to comprise altered audio content, e.g., deepfake, altered voice attribute or vocal quality, such as to convey a particular emotional content that was determined to be absent (e.g., empathetic), or present but determined to require removal (e.g., irritation), from the vocalizations provided by the agent's unaltered voice. As used herein, "words" and "phrases" has their ordinary and customary meaning. An "utterance," as used herein comprises a sound, quasi-word, pseudo-word(s), etc., vocalized by the agent. For example, an utterance such as "uh huh" is generally understood to mean "yes," an acknowledgement of understanding, an acknowledgement of hearing, etc.; a vocalization of "hmm," is generally understood to mean puzzlement, curiosity, uncertainty, etc.; a vocalization of "oh" is generally understood to mean surprise, confusion, disappointment, etc.; and so on. Other utterances examples may include particular sounds provided, such as those utilized by non-English speakers.

In one embodiment, the agent's spoken words are maintained while the sound of the agent's voice is modified. The modified voice may differ in terms of qualities or attributes, such as pitch, tone, rhythm (e.g., too choppy or smooth flow), speed (for all or a portion of the speech), resonance, tempo, and texture. Inter-human communications are complex and often nuanced, especially when the communication is performed via speech. This is further complicated when the parties are not able to see each other, such as during an audio-only call over a network. Words may convey one meaning that may be enhanced or counteracted based on the particular vocal qualities. For example, during a technical support call, an agent may speak the words, "I see your problem." However, if the work "your" is emphasized, an additional or alternative meaning may be conveyed, such as insincerity, an attempt to blame the customer for the problem, etc. In contrast, if "I see" is emphasized, the meaning may be one of surprise, epiphany, etc. which may be more conducive to conveying support, understanding, and concern to the customer. Similar alterations in meaning can be conveyed based on pacing, tone, etc. For example, a slow, hard, labored, monotone, "'Oh, I am sorry to hear about the problem," may convey irritation, indifference, or lack of concern, whereas a crisp, clear, wording with the appropriate pace and/or tone, such as to convey a softness or sympathy may convey support, attention, concern, or confidence to resolve the particular issue.

If, for example, after speaking "'Oh, I am sorry to hear about the problem," the system may determine a need to convey confidence to get the problem resolved. If the agent then says "nevertheless, we are here and will get your problem sorted out today", the system may alter the pitch to be higher, the tone to be cheerful and not too soft, so as to convey to the customer an assurance that their issue is being given proper consideration and will be resolved.

In another example, when a customer is calling for an emergency situation, such as requesting an ambulance or roadside assistance after an accident, the customer service agent's voice should be presented to the customer with a softer tone and higher pitch so that their voice comes off sweeter in order to soothe the customer. Here, the resonance of voice can also be adjusted so the voice sounds more like it is coming from deep within the throat to provide the customer with an impression of caring, rather than a voice having a sound resembling that produced in a nasal passage, which may convey to the customer a sense the agent is irritated.

In another embodiment, human speech, such as that provided by agents to customers during a communication, are observed and quantified. The speech is quantified to note when the agent uses specific vocalized attributes, along with the state and situation of the call (e.g., time in interaction, sentiment via text transcribed from voice, sentiment trajectory, information just/about to be exchanged), and the result(s) of the interaction or sub-phase of the interaction to create a training database. The quantification may be performed by automated means and, additionally or alternatively, humans may provide inputs, including training inputs, to identify sounds for an untrained or erroneous trained neural network or other artificially intelligent agent. Human input may be provided to give the systems a human's perception of all humans or of a particular group of humans. For example, a first human, such as one having a particular demographic attribute, may find a particular quality of an agent's speech to be harsh, cold, uncaring, and generally negative, whereas another human, such as one having a different demographic attribute, may find that particular speech efficient and effective, and generally positive. Accordingly, a neural network may be trained to apply vocalized attribute modifications to a communication presented to a customer that are more specific to a particular customer or category of customer.

In another embodiment, to optimize interactions, machine learning is utilized to determine best practices of appropriate vocalized attributes based on the observations of particular vocalizations and situations (e.g., sentiment, emotion of the call, customer demographic, etc.). The success of an interaction may be determined based on the duration of the interaction, customer feedback, and/or automatic analysis of a transcription of the interaction.

In another embodiment, manual or automatic deliberate variations may be applied to the determined appropriate vocalized attribute as presented to a number of customers as a control and experimental group, or AB testing, in order to determine if a variation improves success of the interactions. The neural network or other AI agent is provided with feedback from the test to provide training to further reinforce the control group vocalized attributes when success with the experimental group is the same or worse, or to change the vocalization attributes utilized when success with the experimental group is improved.

In another embodiment, an audio recording may be made of the raw and/or modified speech. Indicia, such as a color coding, may be applied to an indicia a of portion of speech wherein the quality of the speech was modified and/or the particular modification utilized.

In another embodiment, the audio quality manipulation features are enabled for a preconfigured duration of time, such as by the contact center system administration, in order to gain insights into how the agents are performing, and the data gathered can be further used for quality control, training, and reporting. Reporting may include metrics such as the number of agents for which the voice attributes were manipulated by the system, the number of manipulations that occurred for a particular agent in a given time interval where the agent's sentiment/emotion deviated from standard or best practices (and the resulting success/failure indicators), the sentiment, emotion, and/or situation that triggered manipulations used for a particular agent, the degree of impact the manipulation had on the success of the interaction, and or other metrics, feedbacks into the systems, and/or training or assessment of agent performance and the need, or lack of need, to manipulate the agent's speech attributes or the degree or type thereof.

Humans utilize vision to receive non-vocalized information about other humans with whom they interact. If there is a mismatch between what a person says and their expressions, that person may be perceived as untrustworthy or insincere. For example, a traveler who missed a flight due to an unfortunate event may contact an agent to rebook their travel. If the agent is smiling, despite providing consoling and understanding words, the customer may conclude that the words are just merely words and without any sincerity behind those words. In contrast, if the agent's expression is one of surprise or worry, the spoken words may be afforded additional sincerity. However, conflicting spoken content and expressions, if appropriate, may not always result in a negative perception. For example, an agent who smiles and says, "I'm sorry, but don't worry, I'll get you on the next available flight," may have the benefit of being perceived as friendly and supportive, as well as disarming what is likely a very stressful situation for the traveler. However, expression may be a matter of degree. A wide grinning smile may be perceived as being amused by the traveler's plight or distracted by something funny not captured by the camera, but a slight smile may be better perceived as reassuring and friendly.

These and other needs are addressed by the various embodiments and configurations of the present invention. The present invention can provide a number of advantages depending on the particular configuration. These and other advantages will be apparent from the disclosure of the invention(s) contained herein.

In one embodiment, facial transformation technology (FTT) is provided to manipulate a video image of an agent's face presented to a customer or other party viewing the video to improve customer perception and improve the results of the interaction.

In another embodiment, human labeling and/or machine observation is provided to observe during interactions to note when agents use specific expressions (e.g., smiles, eyebrow arches, concerned look, etc.), along with state and situation of call (e.g., topic, time in interaction, sentiment via voice, sentiment trajectory, information exchanged or about to be exchanged), and result(s) of interaction or sub-phase of the interaction to create/modify a training database. Then, use machine learning to identify the best results and associated expressions, within the state and/or situation of the call, to determine the best practices of expressions in order to optimize future interactions. In another embodiment, a real-time system is provided that uses the machine-learning-determined best practices and/or other inputs to manipulate agent faces in a video stream during the interaction in order to change or further ensure the outcome of the interactions.

In another embodiment, interactions may be paired and provided with different video modifications and the results of the interactions assessed to further optimize the interactions and identify which modifications are successful and/or when certain modifications are successful.

In another embodiment, the actual agent expressions and artificial overlays may be recorded, such as for use in a quality management and review process. In a further embodiment, a code, such as a color code, may be applied to readily categorize quality management records, such as records that signify when a manipulation was or was not used.

In one embodiment, a system for providing situationally-matched expression in a video image is disclosed, comprising: a communication interface configured to receive a video image of a human agent engaged in an interaction via a network with a customer utilizing a customer communication device; a processor having an accessible memory; a data storage configured to maintain data records accessible to the processor; and the processor configured to: receive the video image of the human agent; determine a desired facial expression of the human agent; modify the video image of the human agent to comprise the desired facial expression; and present the customer communication device with the modified video image of the human agent.

In another embodiment, a method is disclosed, comprising: receiving a video image of a human agent engaged in an interaction over a network with a customer via an associated customer communication device; determining a desired facial expression of the human agent; modifying the video image of the human agent to comprise the desired facial expression; and presenting the customer communication device with the modified video image of the human agent.

In another embodiment, a system is disclosed, comprising: means to receive a video image of a human agent engaged in an interaction over a network with a customer via an associated customer communication device; means to determine a desired facial expression of the human agent, wherein the desired facial expression is selected in accordance with facial expression associated with an attribute of the interaction and a successful outcome for past interaction having the attribute; means to modify the video image of the human agent to comprise the desired facial expression; and means to present the customer communication device with the modified video image of the human agent.

In another embodiment, a system is disclosed for providing situationally-matched vocalized attributes in an audio portion of a communication, comprising: a communication interface configured to receive audio comprising speech from a human agent engaged in an interaction via a network with a customer utilizing a customer communication device; a processor having an accessible memory; a data storage configured to maintain data records accessible to the processor; and the processor configured to: receive audio of the human agent's speech; determine a desired vocalized attribute of the human agent's speech; modify the audio of the human agent's speech to comprise the desired vocalized attribute; and present the customer communication device with a modified audio of the human agent's speech.

In another embodiment, a method is disclosed comprising: receiving audio of a human agent's speech while engaged in an interaction over a network with a customer via an associated customer communication device; determining a desired vocalization attribute of the human agent's speech; modifying the audio of the human agent's speech to comprise the desired vocalization attribute; and presenting the customer communication device with a modified audio of the human agent's speech.

In another embodiment, a system is disclosed comprising: means to receive audio of a human agent's speech while engaged in an interaction over a network with a customer via an associated customer communication device; means to determine a desired vocalization attribute of the human agent's speech, wherein the desired vocalization attribute is selected in accordance with a vocalization attribute associated with an attribute of the interaction and a successful outcome for past interaction having the vocalization attribute; means to modify the audio of the human agent's speech to comprise the desired vocalization attribute; and means to present the customer communication device with the modified audio of the human agent's speech.

Aspects of any one or more of the above embodiments include one or more of: wherein determining the desired vocalized attribute of the human agent comprises, accessing a record in the data records having a topic matching a topic of the interaction and wherein the record identifies the desired vocalized attribute;

wherein determining the desired vocalized attribute of the human agent comprises, accessing a current customer attribute of the customer and a record in the data records having a stored customer attribute matching the current customer attribute and wherein the record identifies the desired vocalized attribute;

wherein determining the desired vocalized attribute of the human agent comprises, accessing a record in the data records having a desired customer impression of a human agent attribute matching a topic of the interaction and wherein the record identifies the desired vocalization attribute;

further comprising the processor storing, in the data storage, at least one of the human agent's speech or modified audio of the human agent's speech wherein the processor modifies the human agent's speech to comprise the desired vocalized attribute, comprising applying alterations to at least one of the pace, tone, flutter, rhythm, accent, inflection, or lilt of the human agent's speech;

wherein: the processor modifies the human agent's speech to comprise the desired vocalization attribute, upon first determining a current vocalization attribute; and the processor determines the current vocalization attribute is a mismatch to the desired vocalization attribute.

wherein the processor determines the current vocalization attribute is a mismatch to the desired vocalization attribute, upon determining the current vocalization attribute and the desired vocalization attribute provide the same emotional expression with a mismatched degree of the same emotional expression;

further comprising the processor storing, in the data storage, indicia of success of the interaction and associated at least one of the desired vocalization attribute or a current vocalization attribute of the human agent;

wherein the processor determines the desired vocalization attribute of the human agent comprising determining the at least one of the desired vocalization attribute or the current vocalization attribute of the human agent having the indicia of success stored in the data storage wherein the determining the desired vocalization attribute of the human agent's speech further comprises, accessing a record in a data storage having a topic matching a topic of the interaction and wherein the record identifies the desired vocalization attribute;

wherein the determining the desired vocalization attribute of the human agent's speech further comprises, accessing a current customer attribute of the customer in a record in a data storage having a stored customer attribute matching the current customer attribute and wherein the record identifies the desired vocalization attribute;

wherein the determining the desired vocalization attribute of the human agent's speech further comprises, accessing a record in a data record having a desired customer impression of a human agent attribute matching a topic of the interaction and wherein the record identifies the desired vocalization attribute;

further comprising storing, in a data storage, at least one of the audio or the modified audio;

wherein the modifying of the audio of the human agent's speech to comprise the desired vocalization attribute, further comprises applying alterations to at least one of the pace, tone, flutter, rhythm, accent, inflection or lilt of the human agent's speech;

wherein the modifying of the audio of the human agent to comprise the desired vocalization attribute, further occurs upon first determining a current vocalization attribute and determining the current vocalization attribute is a mismatch to the desired vocalization attribute;

determining the current vocalization attribute is a mismatch to the desired vocalization attribute, further comprises determining the current vocalization attribute and the desired vocalization attribute provide the same expression with a mismatched degree of the same vocalization attribute; and further comprising storing, in the data storage, indicia of success of the interaction and associated at least one of the desired vocalization attribute or a current vocalization attribute of the human agent.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 4 depicts a first data structure in accordance with embodiments of the present disclosure;

FIG. 5 depicts a second data structure in accordance with embodiments of the present disclosure;

FIG. 10 depicts a third data structure in accordance with embodiments of the present disclosure;

FIG. 11 depicts a fourth data structure in accordance with embodiments of the present disclosure.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
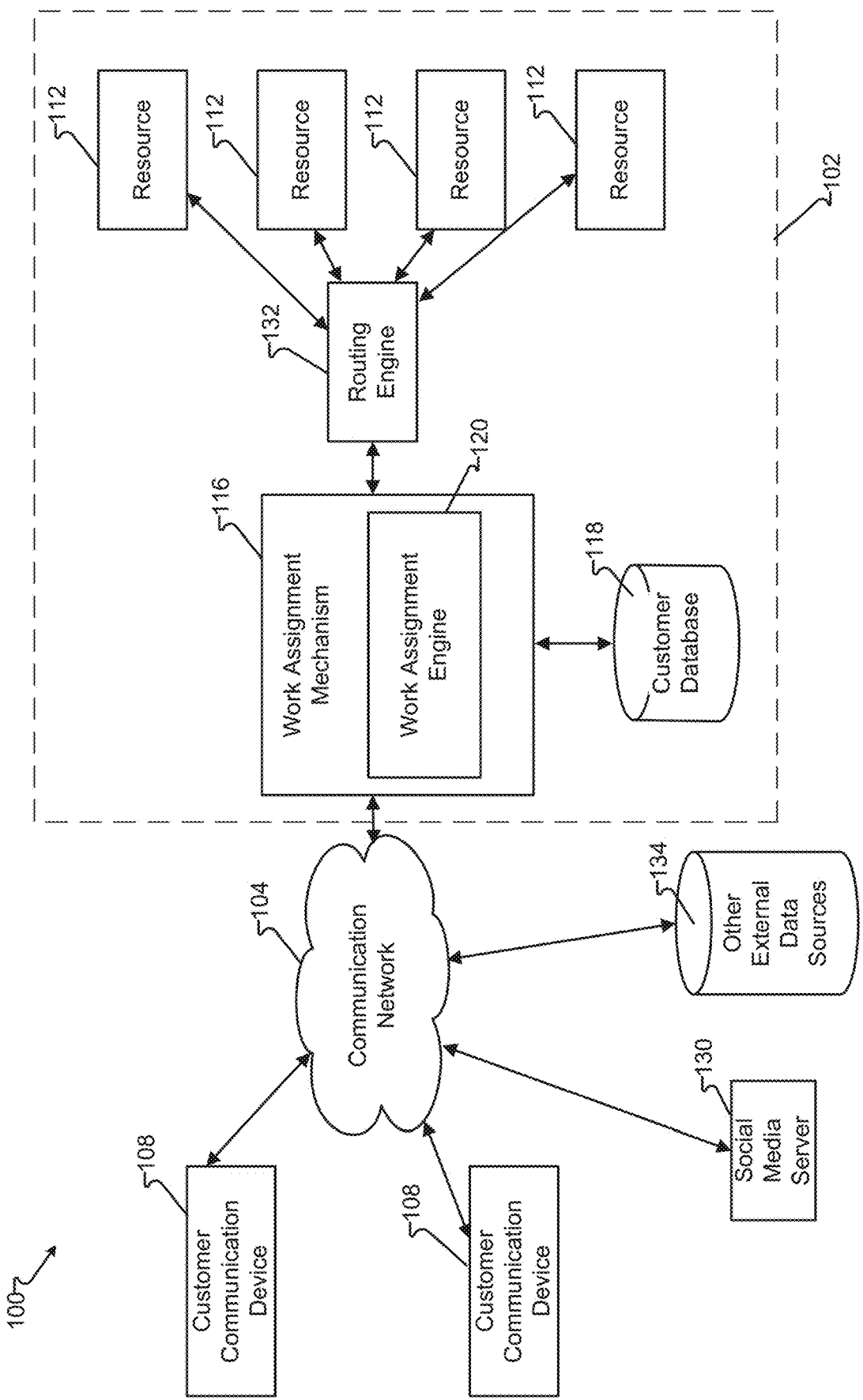
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus or third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. No. 12/784,369, Ser. No. 12/706,942, and Ser. No. 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
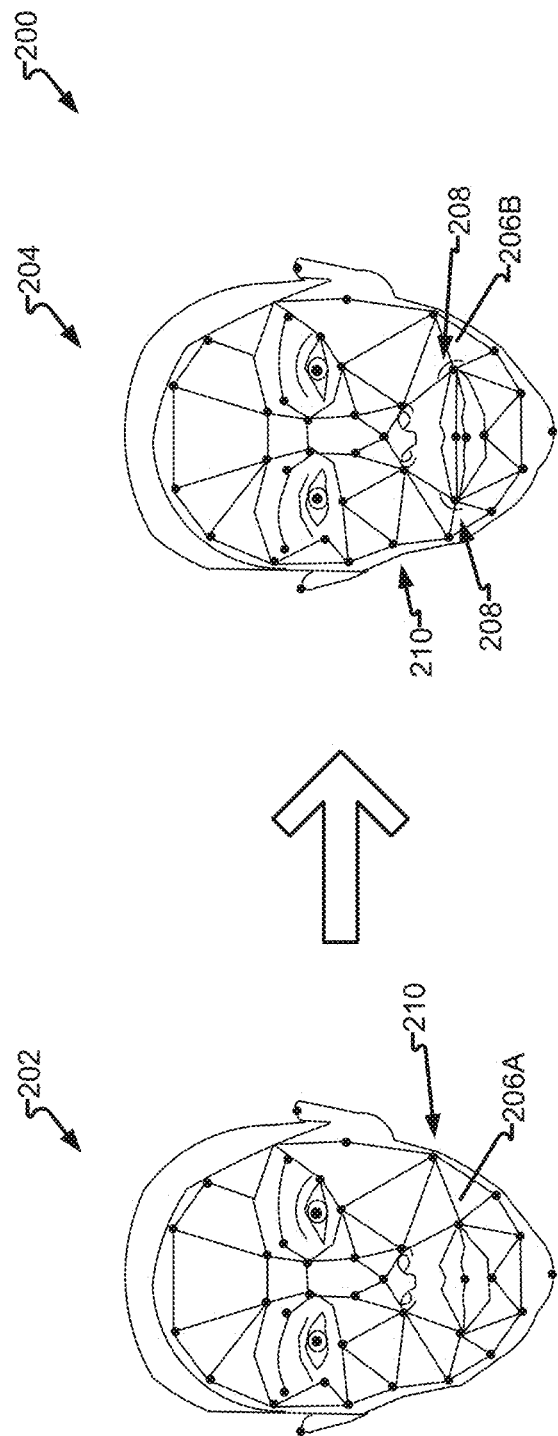
FIG. 2 depicts a video image manipulation in accordance with embodiments of the present disclosure.

FIG. 2 depicts video image manipulation 200 in accordance with embodiments of the present disclosure. In one embodiment, original video image 202 comprises an image of a human agent captured by a camera during an interaction with a customer, such as a customer utilizing customer communication device 108 when embodied to present video images. As will be discussed more completely with respect to embodiments that follow, a processor receives original video image 202 and, upon determining a mismatch between the human agent's expression presented within original video image 202 and a desired expression, applies a modification to original video image 202 to become modified video image 204 presenting the image of the human agent to the customer via their customer communication device 108 and original video image 202 is not provided to customer communication device 108.

A human, such as an agent, may not be providing the desired facial expression due to a distraction (e.g., thinking about lunch), physical limitation, improper training, misunderstanding the task with the customer, or other reason. When video is utilized, this may be off-putting and decrease the chances for a successfully outcome of the interaction. It may improve the outcome of the interaction if the customer is presented with an image of an agent having an expression that has been determined to increase the success of the interaction, which may be the reason for the work item associated with the interaction.

Systems and methods to manipulate real-time video images, such as original video image 202 to become modified video image 204 are now more widely available. The somewhat older technology of manipulating still images, when utilized on computing systems having processors with sufficient processing power, memory, and bandwidth may manipulate individual frames of a video image to create the desired manipulated image. In one embodiment, a human agent's face is mapped, such as by electronically applying markers 210 (e.g., dots) to the image, when a manipulation is desired, the geometry of a polygon, with vortices identified by markers 210, may be altered and the portion of the original video image 202 image therein adjusted (e.g., stretched, shrunk, etc.) to fill the image of the modified polygon and become, at least a portion of, modified video image 204. For example, polygon 206A is reshaped to become polygon 206B and the portion of original image 202, captured within polygon 206A, modified to fill polygon 206B.

Manipulating the image of a human agent's face may account for some of all of the desired modification of the image. Changes to the agent's face may also be applied. For example, smile lines 208 may be added. Additionally, or alternatively, graphic elements may be removed, such as when an agent is smiling (e.g., has smile lines) and the modified image will make the agent appear more serious and, among other things, has the smile lines removed. Such graphical elements may be stored as images, such still or video images of the agent providing a number of facial expressions to be mapped to a polygon (e.g., polygon 206A) and/or algorithmically determined manipulations (e.g., polygon 206A needs to be modified to become polygon 206B, shading selectively applied to create smile lines 208, etc.). The selection of the particular manipulation technique may be made, at least in part, by the bandwidth available and/or attribute of customer communication device 108 for the interaction between the human agent and customer communication device 108. For example, if the customer is watching a video on a low resolution screen (e.g., a cellular telephone), then more nuanced expression changes may be omitted as the resolution presented to the customer, due to the small screen size or the data contained in a low-bandwidth video, may not be capable of presenting such nuanced image components. In contrast, a customer utilizing a high-resolution/high-bandwidth connection may be presented with modified image 204 comprising a greater number of manipulations from original video image 202.

Figure 3:
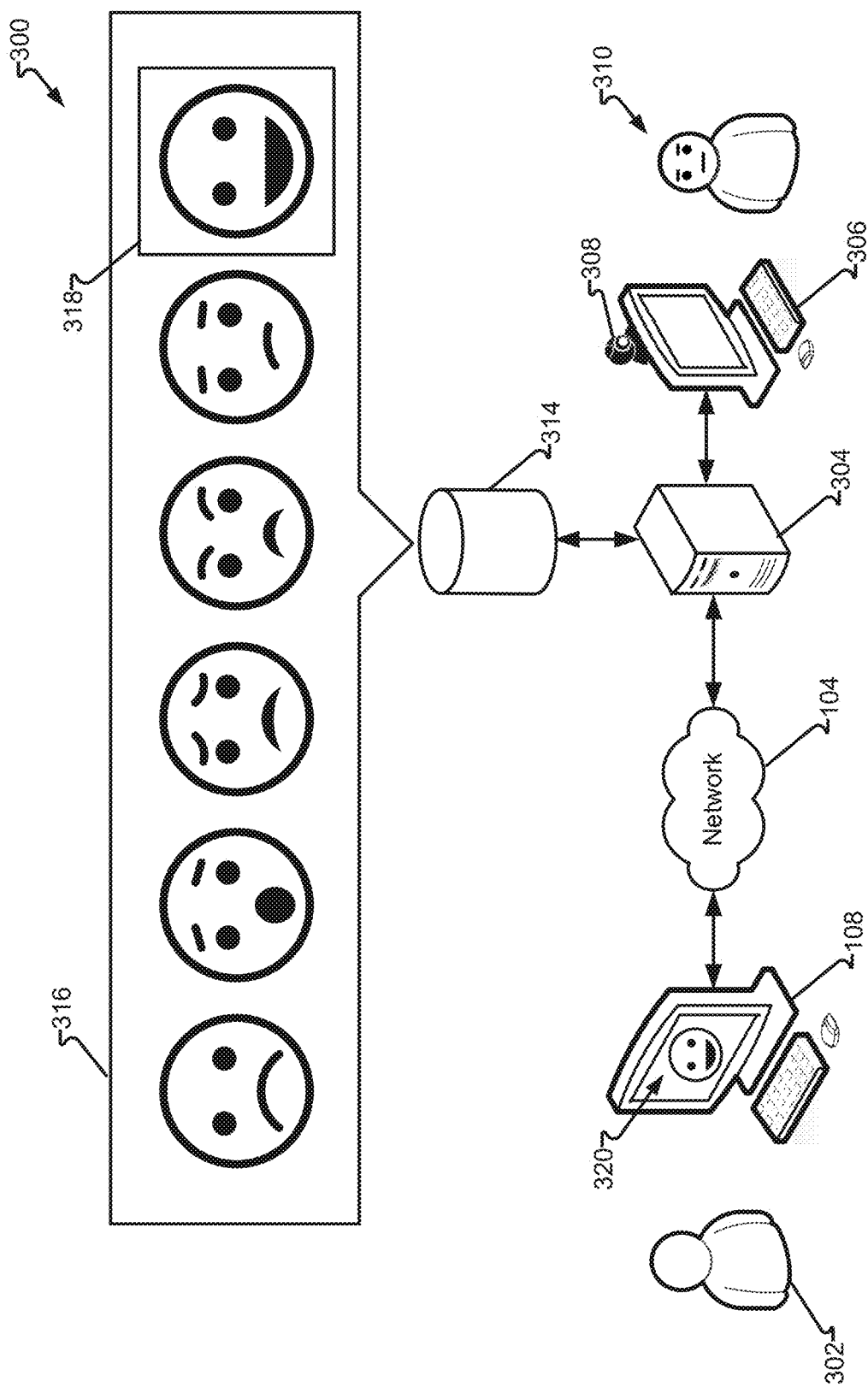
FIG. 3 depicts a second system in accordance with embodiments of the present disclosure.

FIG. 3 depicts system 300 in accordance with embodiments of the present disclosure. In one embodiment, customer 302 and human agent 310 are engaged in an interaction that, at least, includes a real-time video image of human agent 310. Human agent 310 may be embodied as resource 112 when further embodied as a human being utilizing agent communication device 306. The interaction may further comprise audio (e.g., speech), text messages, emails, co-browsing, etc. from human agent 310, customer 302, or both. Human agent 310 has a current facial expression. Server 304, which comprises at least one processor with a memory and further comprises, or has access to, such as via a communication interface, data repository 314. Server 304 may receive a real-time video image via camera 308 of agent communication device 306 and monitor the interaction between customer 302 and human agent 310. Server 304 may determine a desired facial expression for human agent 310. The desired facial expression may comprise a facial expression determined to indicate a desired emotional state that has previously been identified as resulting in a greater likelihood of successfully completing the interaction. For example, server 304 may determine that a desired facial expression comprises a smile. If server 304 determines there is no mismatch (e.g., human agent 310 is smiling and the desired facial expression is also a smile) then server 304 may provide the unmodified, original image of human agent 310 as presented in video image 320. However, if server 304 determines that there is a mismatch between the facial expression of human agent 310 and the desired facial expression, then server 304 may access data structure 316 and select replacement image 318.

It should be appreciated by one of ordinary skill in the art that data structure 316, comprising replacement image 318, is illustrated as having graphically different facial expressions in order for the embodiment to be more readily understood and to avoid unnecessarily complicating the figures and description. Data structure 316 may comprise a number of records such as for each desired facial expression, such as replacement image 318, which may further be embodied as a computer-readable data structure and/or algorithmic modification(s) to an image or portion thereof, including but not limited to, polygon identifiers mapped to a portion of an image of human agent 310 and/or the manipulation(s) to apply to a polygon(s) mapped to the face of human agent 310, graphical elements to add and/or remove (e.g., smile lines), vectors to reposition markers associated with polygon vertices, and/or other graphical image manipulation data/instructions. As a result, server 304 may select a desired facial expression and apply replacement image 318 to the real-time image of human agent 310 to cause presented video image 320 to be of human agent 310, as manipulated, to have the facial expression determined, at least in part, by replacement image 318.

FIG. 4 depicts data structure 400 in accordance with embodiments of the present disclosure. In one embodiment, data structure 400 is utilized by at least one processor of server 304 to determine the desired facial expression for human agent 310, such as when an overall facial expression is known and a particular degree or level is known. Server 304 may determine that a particular level 402 is appropriate for previously selected facial expression 404 and one of records 406 selected therefrom. Data structure 400 comprises records 406 that identify and/or comprise the specific image manipulations for a desired facial expression. For example, a level two frown (FR2) may be subsequently identified, such as within data structure 316, to access the specific image manipulations required to cause such a facial expression to be provided as presented video image 320.

Not every facial expression, even within the same type of facial expression, is equivalent. For example, one smile may be an expression of friendliness, whereas another smile may be appropriate when something amusing occurs, as may be true with other emotions. As another example, customer 302 may be engaged in an interaction with human agent 310 and server 304 determines that a desired facial expression for human agent 310 is a frown, such as to show sadness to commiserate with customer 302 after learning that customer 302 is missing a bag from an airline flight. However, if customer 302 indicates that the bag contained only a few old clothes, one level of a frown may be appropriate, versus the frown appropriate if customer 302 indicates that the bag contained a very expensive camera. Accordingly, data structure 316 may comprise data structures for various degrees or levels of a particular desired facial expression.

FIG. 5 depicts data structure 500 in accordance with embodiments of the present disclosure. Humans learn what facial expressions are and are not appropriate. This determination is often highly intuitive and difficult to quantify. For example, a smile may be taken as friendly or demeaning (e.g., being laughed at). Humans may wish to commiserate with another human, and therefore show a facial expression associated with an emotion of the other person. However, the opposite emotion, and associated facial expression, may provide reassurance, authority, or other state associated with a particular interaction. For example, a traveler who is missing a bag may be presented with a smiling agent who says, "that's easy, we'll get that taken care of," in order to provide the traveler with the impression that the issue will be successfully resolved and the agent is able to facilitate the resolution.

Accordingly, and in one embodiment, data structure 500 comprises data records 506 associated with topics 504 and desired emotional responses 502. For example, a processor of server 304 may determine that an interaction between customer 302 and human agent 310 comprises "topic attribute 2" (e.g., in-flight food). Server 304 may further determine that the desired emotional response comprises "understanding." Accordingly, surprise level 1 (SP1) is selected, such as from data structure 316 and applied to the image of human agent 310. Additionally, or alternatively, an attribute of customer 302 may be utilized to determine the particular desired facial expression and/or degree thereof. For example, customer 302 may be highly expressive and relate well to human agents that are also highly expressive. Accordingly, a particular image manipulation or level of image manipulation may be selected. In contrast, customer 302 may be uncomfortable with highly expressive agents and, accordingly, a different image manipulation or level of image manipulation is provided. Such differences may be based, alone or in part, on culture, gender, geography, age, education, occupation, and/or other attribute of customer 302 specifically or as being within a particular demographic.

In another embodiment, machine-learning may be provided to determine a particular desired facial expression. For example, server 304 may select an alternative desired facial expression for human agent 310 that is not the desired facial expression. If the results of the interaction between customer 302 and human agent 310 are successful, then a weighting is applied to the alternative desired facial expression that causes it to be selected more frequently or become the desired facial expression.

Figure 6:
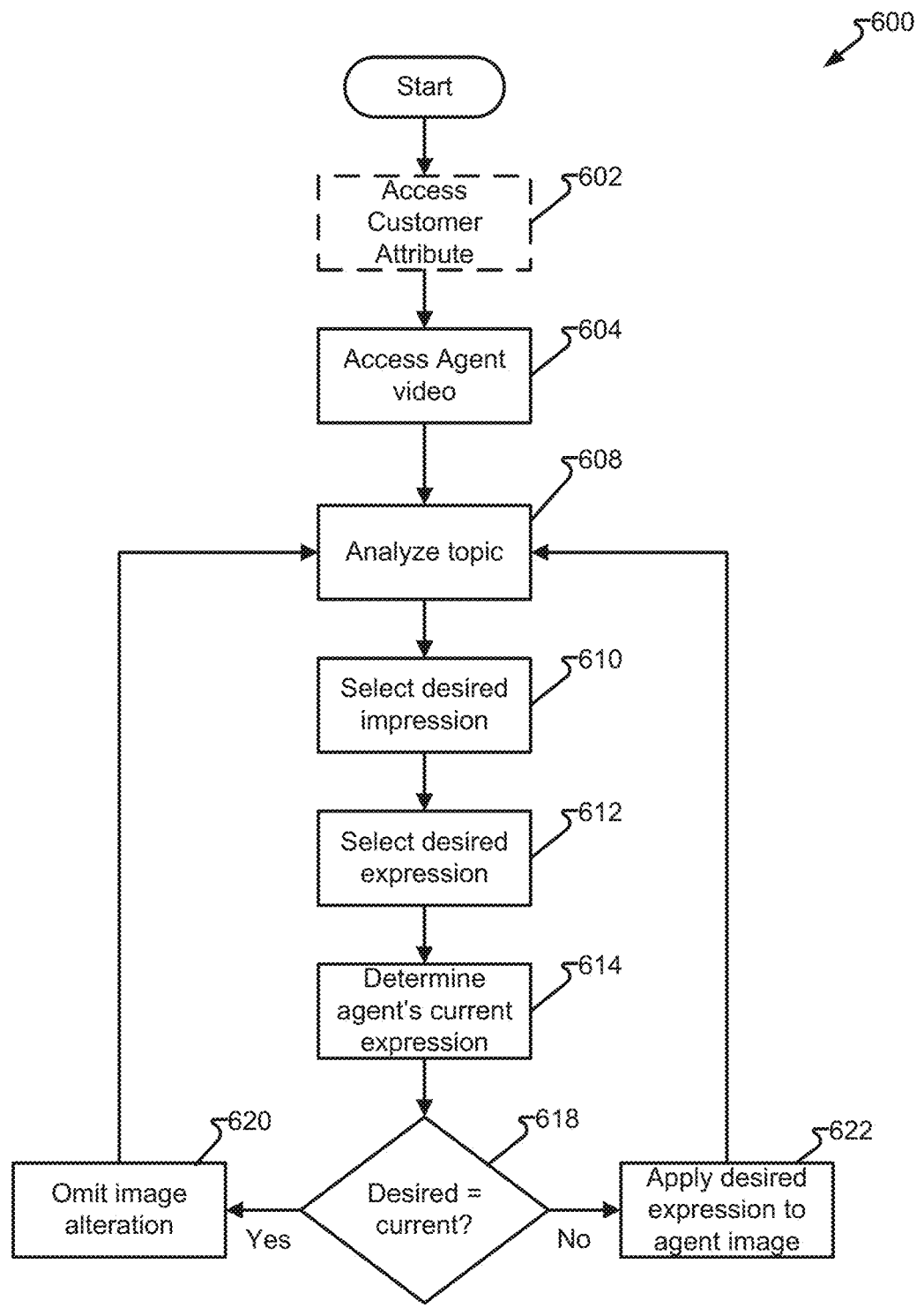
FIG. 6 depicts a first process in accordance with embodiments of the present disclosure.

FIG. 6 depicts process 600 in accordance with embodiments of the present disclosure. In one embodiment, at least one processor, such as a processor of customer 302 is configured to execute process 600 when embodied as machine-readable instructions for execution thereby. Process 600 begins and optional step 602 accesses a customer attribute. For example, a particular customer 302 may prefer highly expressive agents or belong to a demographic that prefers highly expressive agents. Step 604 accesses a real-time video of the agent, such as by camera 308 accessing providing a real-time image of human agent 310 while engaged in an interaction with customer 302. Next, step 608 analyses the topic of the interaction. Step 608 may be performed by the agent alone, such as by indicating a topic the customer wishes to address, the customer alone, such as via an input to an interactive voice response (IVR) or other input prior to initiating the interaction with the agent, and/or by monitoring keywords or phrases provided within the interaction.

Next, step 610 determines a desired impression for the agent to provide. For example, it may have been previously determined that, for a particular customer and/or topic, the agent should make a particular impression, such as authoritative, sympathetic, respectful, friendly, etc. in order to improve the prospect of resolving the interaction successfully. Step 612 then selects a desired facial expression in accordance with the desired impression and, in step 614, the agent's current expression. Test 618 determines if the agent's current expression is, or is not, a match to the desired facial expression. If test 618 is determined in the affirmative, then step 620 provides the unmodified image of the agent to the customer. However, if test 618 is determined in the negative, then step 622 applies the modifications to the agent's facial expression and provides the modified image of the agent to the customer. Process 600 may then continue back to step 608 to analyze a subsequent topic or, if the interaction is complete, process 600 may end.

Figure 7:
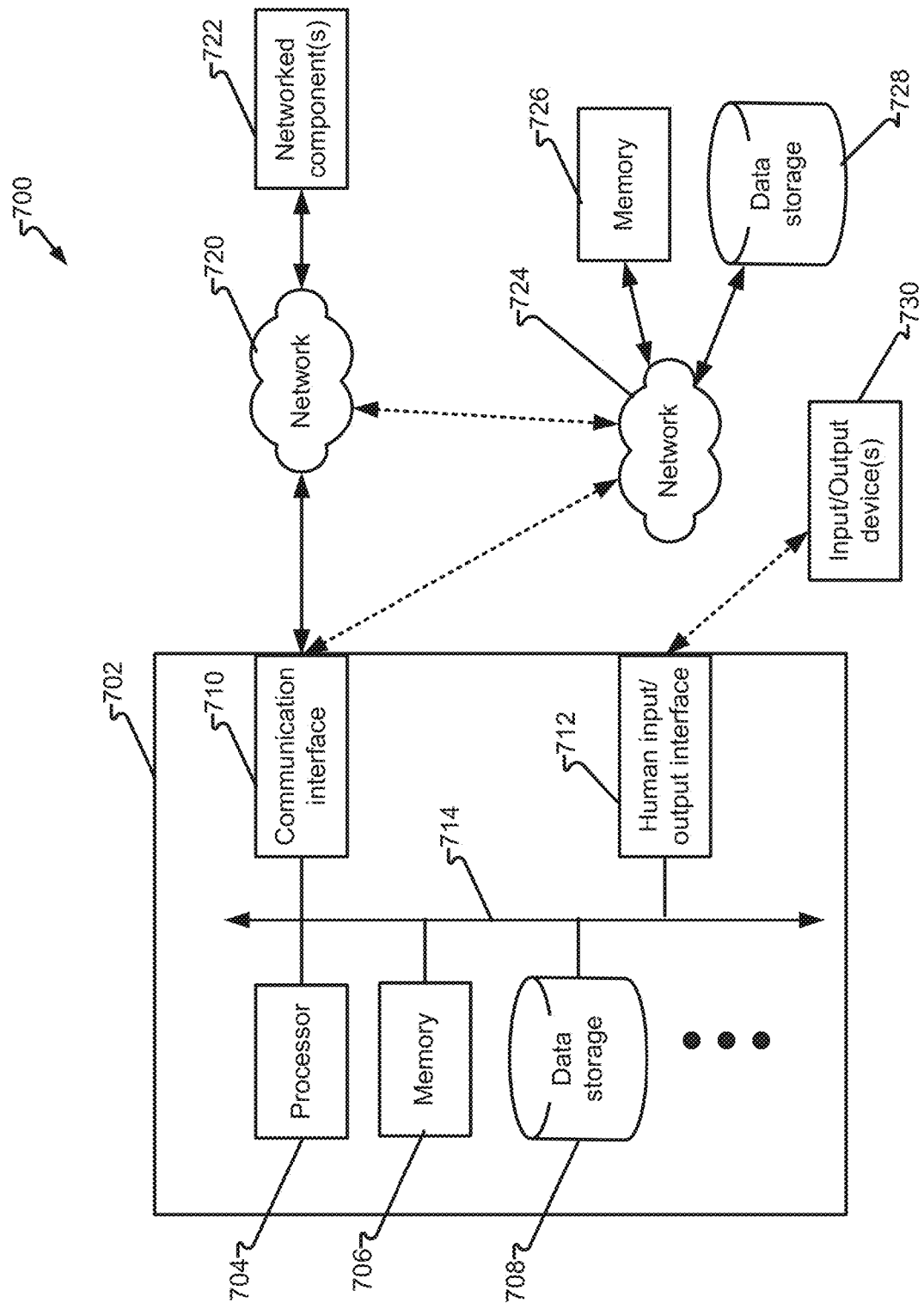
FIG. 7 depicts a fourth system in accordance with embodiments of the present disclosure.

FIG. 7 depicts system 700 in accordance with embodiments of the present disclosure. In one embodiment, agent communication device 306 and/or server 304 may be embodied, in whole or in part, as device 702 comprising various components and connections to other components and/or systems. The components are variously embodied and may comprise processor 704. Processor 704 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc.), such as received via bus 714, execute instructions, and output data, again such as via bus 714.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally, or alternatively, input/output interface 712 connects to one or more interface components to receive and/or present information (e.g., instructions, data, values, etc.) to and/or from a human and/or electronic device. Examples of input/output devices 730 that may be connected to the input/output interface 712 include, but are not limited to, keyboard, mouse, trackball, printers, displays, sensor, switch, relay, etc. In another embodiment, communication interface 710 may comprise, or be comprised by, input/output interface 712. Communication interface 710 may be configured to communicate directly with a networked component or utilize one or more networks, such as network 720 and/or network 724.

Communication network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722.

Additionally, or alternatively, one or more other networks may be utilized. For example, network 724 may represent a second network, which may facilitate communication with components utilized by device 702. For example, network 724 may be an internal network to contact center 102 whereby components are trusted (or at least more so) than networked components 722, which may be connected to network 720 comprising a public network (e.g., Internet) that may not be as trusted. Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via input/output interface 712 and/or via communication interface 710 either directly, via network 724, via network 720 alone (not shown), or via networks 724 and 720.

It should be appreciated that computer-readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. Ones of ordinary skill in the art will appreciate that other communication equipment may be utilized, in addition or as an alternative, to those described herein without departing from the scope of the embodiments.

Figure 8:
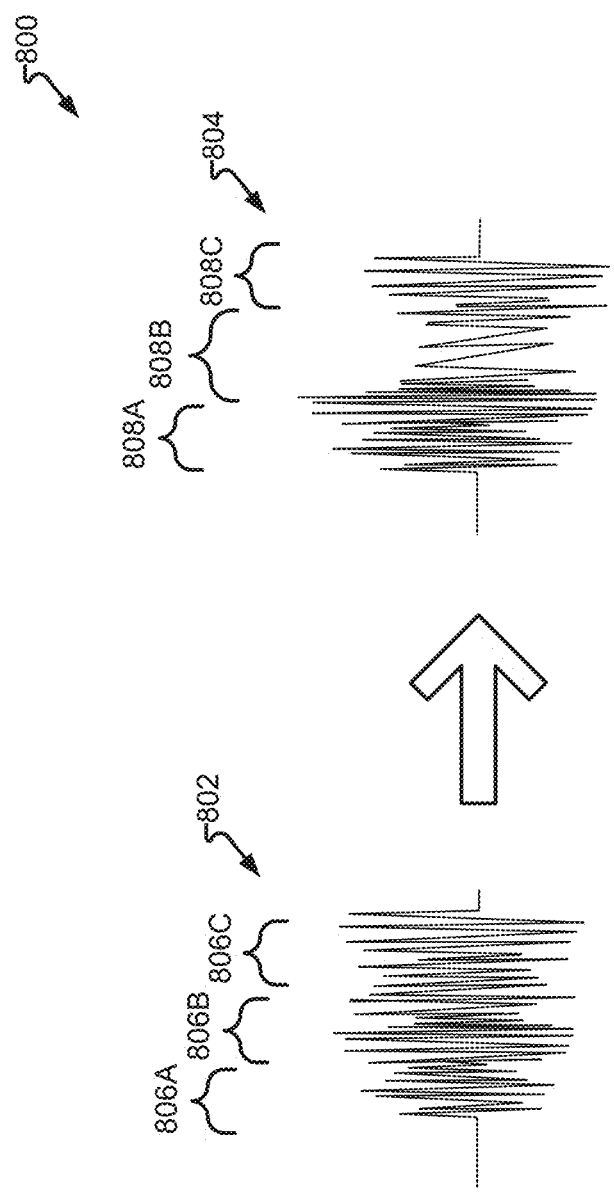
FIG. 8 depicts an audio manipulation in accordance with embodiments of the present disclosure.

FIG. 8 depicts audio manipulation 800 in accordance with embodiments of the present disclosure. In one embodiment, original audio 802 comprises speech, utterances, and/or other vocalization attributes of a human agent captured by a microphone during an interaction with a customer, such as a customer utilizing customer communication device 108 when embodied to present audio. As will be discussed more completely with respect to embodiments that follow, a processor receives original audio 802 and, upon determining a mismatch between the human agent's vocalization attributes presented within original audio 802 and a desired vocalization attribute, applies a modification to original audio 802 to become modified audio 804 presenting the audio of the human agent to the customer via their customer communication device 108 and original audio 802 is not provided to customer communication device 108.

A human, such as an agent, may not be providing the desired audio attributes due to a distraction (e.g., thinking about lunch), physical limitation, improper training, misunderstanding the task with the customer, or other reason. When audio is utilized, in particular when audio is provided in the absence of video, this may be off-putting and decrease the chances for a successfully outcome of the interaction. However, it may improve the outcome of the interaction if the customer is presented with speech from the agent having the audio attributes that have been determined to increase the success of the interaction, which may be the reason for the work item associated with the interaction.

Systems and methods are provided to manipulate real-time audio comprising speech, such as original audio 802 to become modified audio 804. In one embodiment, a human agent's audio is analyzed to determine attributes other than the words explicitly spoken, such as a scoring for various attributes and/or categories of attributes. The vocalized attributes may include tone, pace, flutter, overall pitch, breath, and/or other vocalization attributes and/or change, rate of change, degree of change, or differences between two or more portions of the speech. For example, speech portion 806A may be modified to become speech portion 808A (e.g., having a greater amplitude/louder), speech portion 806B may be modified to become speech portion 808B (e.g., slower), and speech portion 806C may be modified to become speech portion 808C (e.g., lower tone).

Manipulating the speech of a human agent's voice may account for some of or all of the desired modification of the audio. In other embodiments, manipulation of the agent's vocalized content may also be applied, such as, a pause added or removed, a sigh added or removed, or a non-speech utterance added or removed.

Figure 9:
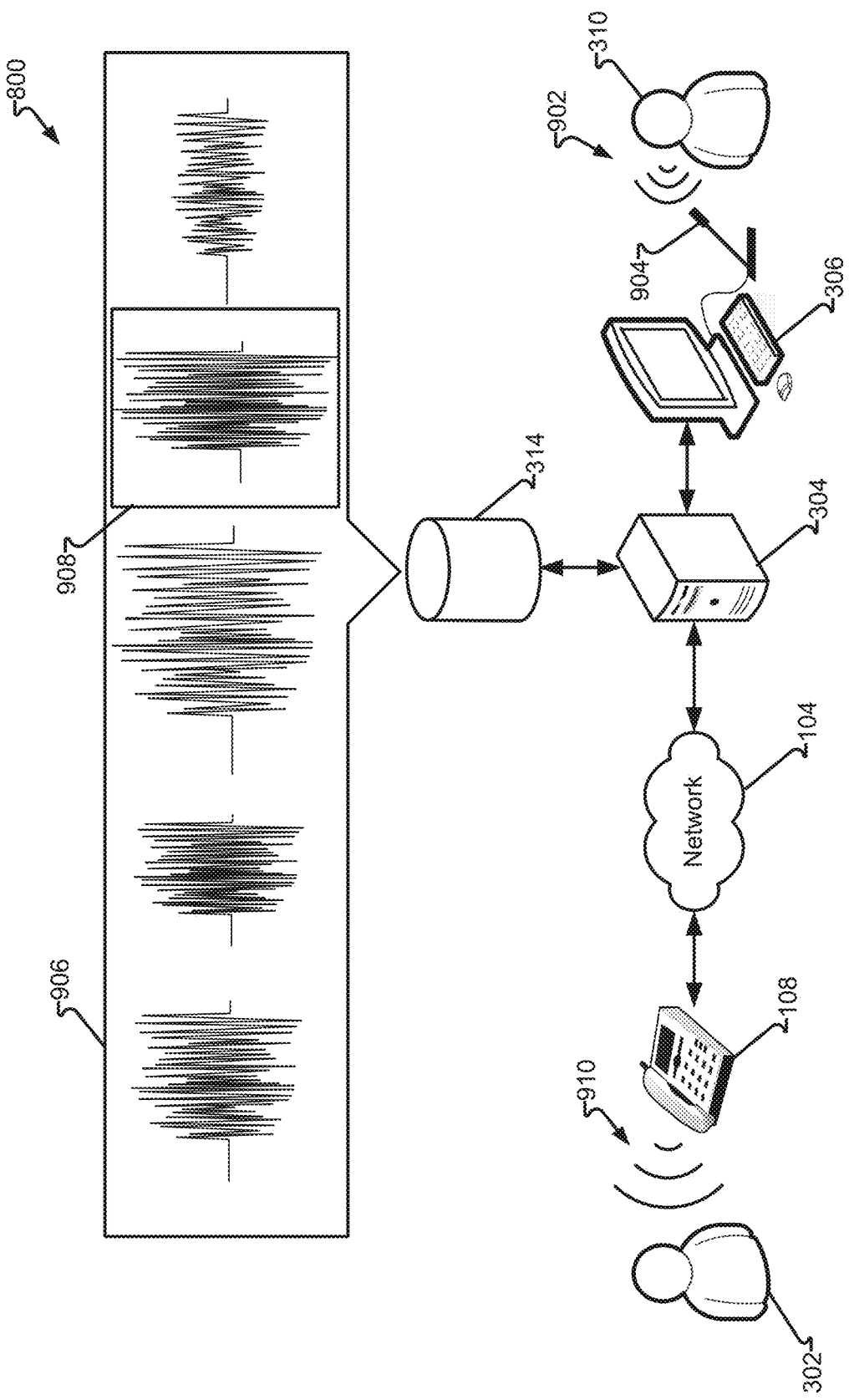
FIG. 9 depicts a fifth system in accordance with embodiments of the present disclosure.

FIG. 9 depicts system 900 in accordance with embodiments of the present disclosure. In one embodiment, customer 302 and human agent 310 are engaged in an interaction that, at least, includes audio comprising speech provided by human agent 310. Human agent 310 may be embodied as resource 112 when further embodied as a human being utilizing agent communication device 306. The interaction may further comprise video, text messages, emails, co-browsing, etc. from human agent 310, customer 302, or both. Human agent 310 has a current vocalized attributes conveying expression (e.g., interested/disinterested, concerned/unconcerned, neutral, etc.) embedded in speech vocalizations 904 (e.g., words) provided by human agent 310. Server 304, which comprises at least one processor with a memory and further comprises, or has access to, such as via a communication interface, data repository 314. Server 304 may receive audio from microphone 904 of agent communication device 306 and monitor the interaction between customer 302 and human agent 310. Server 304 may determine a desired vocalized attribute for human agent 310. The desired vocalized attribute may comprise a vocalized attribute determined to indicate a desired emotional state that has previously been identified as resulting in a greater likelihood of successfully completing the interaction. For example, server 304 may determine that a desired vocalized attribute comprises a lilt (e.g., a rising and falling tone commonly associated with friendliness). If server 304 determines there is no mismatch (e.g., human agent 310 is speaking in a manner wherein a lilt is provided), then server 304 may provide the unmodified, original audio of human agent 310 as presented in presented audio 910. However, if server 304 determines that there is a mismatch between the vocalized attribute of human agent 310 and the desired vocalized attribute, then server 304 may access data structure 906 and select modification 908.

It should be appreciated by one of ordinary skill in the art that data structure 906, comprising modification 908, is illustrated as having graphically different sound waves in order for the embodiment to be more readily understood and to avoid unnecessarily complicating the figures and description. Data structure 906 may comprise a number of records such as for each desired vocalized attribute, such as modification 908, which may further be embodied as a computer-readable data structure and/or algorithmic modification(s) to sound waves or portion thereof, including but not limited to, portions of a vocalization attributes mapped to manipulations, such as which syllable to accent, a portion to say faster or slower, a portion to speak at a higher or lower pitch, a portion to speak with uniformity or as variation of that spoken in a different portion, etc.

As a result, server 304 may select a desired vocalized attribute and apply modification 908 to the real-time speech of human agent 310 to cause presented audio 910 to be speech of human agent 310, as manipulated, to have the vocalized attribute(s) determined, at least in part, by modification 908.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

In one embodiment, A computer-implemented method of training a neural network for emotional tone mismatch in a spoken communication over a network comprising: collecting a set of prior audio recordings, the audio recordings comprising speech from agents engaged in a communication with a customer over a network; applying one or more transformations to at least one portion of each audio recording including pitch increase, pitch decrease, speed increase, speed decrease, increase flutter, decrease flutter, increase lilt, decrease lilt, increase smoothness, decrease smoothness, increase volume, decrease volume, increase monotone, decrease monotone, increase in change of any one or more of the foregoing, decrease in change in any one or more of the following to create a modified set of audio recordings; creating a first training set comprising the collected set of audio recordings, the modified set of audio recordings, and a set of emotionally neutral audio recordings (e.g., flat, monotone, etc.); training the neural network in a first stage using the first training set; creating a second training set for a second stage of training comprising the first training set and emotionally neutral audio recordings that are incorrectly detected as having emotional content after the first stage of training; and training the neural network in the second stage using the second training set.

FIG. 10 depicts data structure 1000 in accordance with embodiments of the present disclosure. In one embodiment, data structure 1000 is utilized by at least one processor of server 304 to determine the desired vocalized attribute for human agent 310, such as when an overall vocalized attribute is known and a particular degree or level is known. Server 304 may determine that a particular level 1002 is appropriate for previously selected vocalized attribute 1004 and one of records 1006 selected therefrom. Data structure 1000 comprises records 1006 that identify and/or comprise the specific audio manipulations for a desired vocalized attribute. For example, a level two flutter (FL2) may be subsequently identified, such as within data structure 906, to access the specific audio manipulations required to cause such a vocalized attribute to be provided as presented audio 910.

Not every vocalized attribute, even within the same type of vocalized attribute, is equivalent. For example, one increase in tone or flutter may be an expression of friendliness, whereas another increase in tone or flutter may be an indication of amusement, as may be true with other emotions. As another example, customer 302 may be engaged in an interaction with human agent 310 and server 304 determines that a desired vocalized attribute for human agent 310 is a frown, such as to show sadness to commiserate with customer 302 after learning that customer 302 is a low, somber tone for missing a bag from an airline flight. However, if customer 302 indicates that the bag contained only a few old clothes, one level of lowered pitch may be appropriate, versus a greater level of lowered pitch, such as may be appropriate if customer 302 indicated that the bag contained a very expensive camera. Accordingly, data structure 316 may comprise data structures for various degrees or levels of a particular desired vocalized attribute.

FIG. 11 depicts data structure 1100 in accordance with embodiments of the present disclosure. Humans learn what vocalized attributes are and are not appropriate. This determination is often highly intuitive and difficult to quantify. For example, a giggle may be taken as friendly or demeaning (e.g., being laughed at). Humans may wish to commiserate with another human, and therefore show a vocalized attributes associated with an emotion of the other person. However, the opposite emotion, and associated vocalized attribute, may provide reassurance, authority, or other state associated with a particular interaction. For example, a traveler who is missing a bag may be presented with an agent with a cheerful lilt who says, "that's easy, we'll get that taken care of," in order to provide the traveler with the impression that the issue will be successfully resolved and the agent is able to facilitate the resolution.

Accordingly, and in one embodiment, data structure 1100 comprises data records 1106 associated with topics 1104 and desired emotional responses 1102. For example, a processor of server 304 may determine that an interaction between customer 302 and human agent 310 comprises "topic attribute 2" (e.g., in-flight food). Server 304 may further determine that the desired emotional response comprises "understanding." Accordingly, surprise level 1 (having pace level 3 (PA3)) is selected, such as from data structure 906 and applied to the speech of human agent 310. Additionally, or alternatively, an attribute of customer 302 may be utilized to determine the particular desired facial expression and/or degree thereof. For example, customer 302 may be highly expressive and relate well to human agents that are also highly expressive. Accordingly, a particular audio manipulation or level of audio manipulation may be selected. In contrast, customer 302 may be uncomfortable with highly expressive agents and, accordingly, a different audio manipulation or level of audio manipulation is provided. Such differences may be based, alone or in part, on culture, gender, geography, age, education, occupation, and/or other attribute of customer 302 specifically or as being within a particular demographic.

In another embodiment, machine-learning may be provided to determine a particular desired vocalized attribute. For example, server 304 may select an alternative desired vocalized attribute for human agent 310 that is not the desired vocalized attribute. If the results of the interaction between customer 302 and human agent 310 are successful, then a weighting is applied to the alternative desired vocalized attribute that causes it to be selected more frequently or become the desired vocalized attribute.

Figure 12:
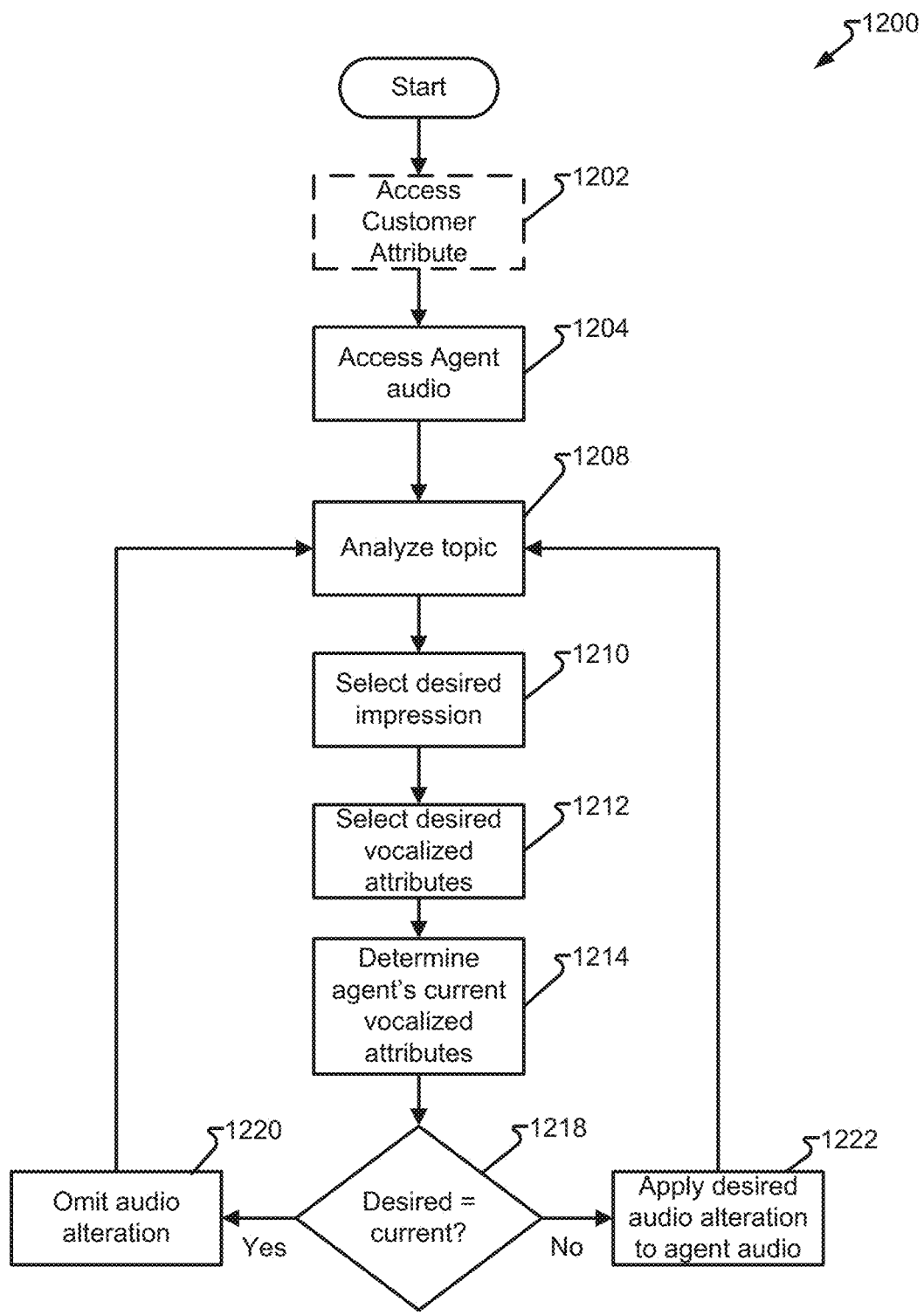
FIG. 12 depicts a second process in accordance with embodiments of the present disclosure.

FIG. 12 depicts process 1200 in accordance with embodiments of the present disclosure. In one embodiment, at least one processor, such as a processor of customer 302 is configured to execute process 1200 when embodied as machine-readable instructions for execution thereby. Process 1200 begins and optional step 1202 accesses a customer attribute. For example, a particular customer 302 may prefer highly expressive agents or belong to a demographic that prefers highly expressive agents. Step 1204 accesses a real-time audio of the agent, such as by microphone 904, capturing real-time speech provided by human agent 310 while engaged in an interaction with customer 302. Next, step 1208 analyses the topic of the interaction. Step 1208 may be performed by the agent alone, such as by indicating a topic the customer wishes to address, the customer alone, such as via an input to an interactive voice response (IVR) or other input prior to initiating the interaction with the agent, and/or by monitoring keywords or phrases provided within the interaction.

Next, step 1210 determines a desired impression for the agent to provide. For example, it may have been previously determined that, for a particular customer and/or topic, the agent should make a particular impression, such as authoritative, sympathetic, respectful, friendly, etc. in order to improve the prospect of resolving the interaction successfully. Step 1212 then selects a desired vocalized attribute in accordance with the desired impression and, in step 1214, the agent's current vocalization attribute. Test 618 determines if the agent's current vocalization attribute is, or is not, a match to the desired vocalization attribute. If test 1218 is determined in the affirmative, then step 1220 provides the unmodified audio of the agent to the customer. However, if test 1218 is determined in the negative, then step 1222 applies the modifications to the agent's vocalized expression and provides the modified audio of the agent to the customer. Process 1200 may then continue back to step 1208 to analyze a subsequent topic or, if the interaction is complete, process 600 may end.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for providing a situationally-matched vocalized attributes in an audio portion of a communication, comprising:
 a communication interface configured to receive audio comprising speech from a human agent engaged in an interaction via a network with a customer utilizing a customer communication device;
 a processor having an accessible memory;
 a data storage configured to maintain data records accessible to the processor; and
 the processor configured to:
  receive audio of the human agent's speech;
  determine a desired vocalized attribute of the human agent's speech comprising accessing a current customer attribute of the customer and a record in the data records having a stored customer attribute matching the current customer attribute and wherein the record identifies the desired vocalized attribute;
  modify the audio of the human agent's speech to comprise the desired vocalized attribute; and
  present the customer communication device with a modified audio of the human agent's speech.

2. The system of claim 1, wherein determining the desired vocalized attribute of the human agent comprises accessing a record in the data records having a topic matching a topic of the interaction and wherein the record identifies the desired vocalized attribute.

3. The system of claim 1, wherein determining the desired vocalized attribute of the human agent comprises accessing a record in the data records having a desired customer impression of a human agent attribute matching a topic of the interaction and wherein the record identifies the desired vocalization attribute.

4. The system of claim 1, further comprising the processor storing, in the data storage, at least one of the human agent's speech or modified audio of the human agent's speech.

5. The system of claim 1, wherein the processor modifies the human agent's speech to comprise the desired vocalized attribute, comprising applying alterations to at least one of a pace, tone, flutter, rhythm, accent, inflection, or lilt of the human agent's speech.

6. The system of claim 1, wherein:
 the processor modifies the human agent's speech to comprise the desired vocalization attribute, upon first determining a current vocalization attribute; and
 the processor determines the current vocalization attribute is a mismatch to the desired vocalization attribute.

7. The system of claim 6, wherein the processor determines the current vocalization attribute is a mismatch to the desired vocalization attribute, upon determining the current vocalization attribute and the desired vocalization attribute provide the same emotional expression with a mismatched degree of the same emotional expression.

8. The system of claim 1, further comprising the processor storing, in the data storage, indicia of success of the interaction and associated at least one of the desired vocalization attribute or a current vocalization attribute of the human agent.

9. The system of claim 8, wherein the processor determines the desired vocalization attribute of the human agent comprising determining the at least one of the desired vocalization attribute or the current vocalization attribute of the human agent having the indicia of success stored in the data storage.

10. A method, comprising:
 receiving audio of a human agent's speech while engaged in an interaction over a network with a customer via customer communication device;
 determining a desired vocalization attribute of the human agent's speech, comprising accessing a record in a data record having a desired customer impression of a human agent attribute matching a topic of the interaction and wherein the record identifies the desired vocalization attribute;
 modifying the audio of the human agent's speech to comprise the desired vocalization attribute; and
 presenting the customer communication device with a modified audio of the human agent's speech.

11. The method of claim 10, wherein the determining the desired vocalization attribute of the human agent's speech further comprises accessing a record in a data storage having a topic matching a topic of the interaction and wherein the record identifies the desired vocalization attribute.

12. The method of claim 10, wherein the determining the desired vocalization attribute of the human agent's speech further comprises accessing a current customer attribute of the customer in a record in a data storage having a stored customer attribute matching the current customer attribute and wherein the record identifies the desired vocalization attribute.

13. The method of claim 10, further comprising storing, in a data storage, at least one of the audio or the modified audio.

14. The method of claim 10, wherein the modifying of the audio of the human agent's speech to comprise the desired vocalization attribute, further comprises applying alterations to at least one of a pace, tone, flutter, rhythm, accent, inflection or lilt of the human agent's speech.

15. The method of claim 10, wherein the modifying of the audio of the human agent to comprise the desired vocalization attribute, further occurs upon first determining a current vocalization attribute and determining the current vocalization attribute is a mismatch to the desired vocalization attribute.

16. The method of claim 15, wherein determining the current vocalization attribute is a mismatch to the desired vocalization attribute further comprises determining the current vocalization attribute and the desired vocalization attribute provide the same expression with a mismatched degree of the same vocalization attribute.

17. The method of claim 10, further comprising storing, in a data storage, indicia of success of the interaction and associated at least one of the desired vocalization attribute or a current vocalization attribute of the human agent.

18. A system, comprising:
 means to receive audio of a human agent's speech while engaged in an interaction over a network with a customer via customer communication device;
 means to determine a desired vocalization attribute of the human agent's speech, wherein the desired vocalization attribute is selected in accordance with a vocalization attribute associated with an attribute of the interaction and a successful outcome for past interaction having the vocalization attribute, wherein the determining the desired vocalization attribute of the human agent's speech further comprises accessing a current customer attribute of the customer in a record in a data storage having a stored customer attribute matching the current customer attribute, and wherein the record identifies the desired vocalization attribute;

means to modify the audio of the human agent's speech to comprise the desired vocalization attribute; and means to present the customer communication device with the modified audio of the human agent's speech.

19. The system of claim 18, wherein the means to determine the desired vocalization attribute of the human agent's speech further comprises means to access a record in a data storage having a topic matching a topic of the interaction, and wherein the record identifies the desired vocalization attribute.

20. The system of claim 18, wherein the means to modify the audio of the human agent's speech to comprise the desired vocalized attribute further comprises means to apply alterations to at least one of a pace, tone, flutter, rhythm, accent, inflection, or lilt of the human agent's speech.

* * * * *

UNITED STATES PATENT AND TRADEMARK OFFICE
CERTIFICATE OF CORRECTION

PATENT NO. : 12,170,095 B2  
APPLICATION NO. : 17/468303  
DATED : December 17, 2024  
INVENTOR(S) : Pushkar Yashavant Deole and Sandesh Chopdekar Page 1 of 1

It is certified that error appears in the above-identified patent and that said Letters Patent is hereby corrected as shown below:

In the Claims

At Column 28, Line 7, after "a network with a customer via" insert --a-- therein.

At Column 28, Line 56-57, after "a network with a customer via" insert --a-- therein.

Signed and Sealed this  
Twentieth Day of May, 2025

Coke Morgan Stewart  
*Acting Director of the United States Patent and Trademark Office*